United States Patent
Ralph et al.

(10) Patent No.: US 11,886,512 B2
(45) Date of Patent: Jan. 30, 2024

(54) INTERPRETABLE FEATURE DISCOVERY WITH GRAMMAR-BASED BAYESIAN OPTIMIZATION

(71) Applicant: FAIR ISAAC CORPORATION, Roseville, MN (US)

(72) Inventors: Christopher Allan Ralph, Toronto (CA); Gerald Fahner, Austin, TX (US); Liang Meng, San Rafael, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 0 days.

(21) Appl. No.: 17/739,106

(22) Filed: May 7, 2022

(65) Prior Publication Data

US 2023/0359672 A1 Nov. 9, 2023

(51) Int. Cl.
*G06F 16/9035* (2019.01)
*G06F 16/903* (2019.01)

(52) U.S. Cl.
CPC .... *G06F 16/9035* (2019.01); *G06F 16/90335* (2019.01)

(58) Field of Classification Search
CPC .............. G06F 16/9035; G06F 16/90335
USPC .......................................... 707/769
See application file for complete search history.

(56) References Cited

U.S. PATENT DOCUMENTS

| | | | | |
|---|---|---|---|---|
| 6,330,546 B1 * | 12/2001 | Gopinathan | .......... | H04M 15/47 705/38 |
| 8,090,648 B2 * | 1/2012 | Zoldi | .................... | G06Q 40/12 705/38 |
| 8,719,298 B2 * | 5/2014 | Konig | .................... | G06F 16/951 707/706 |
| 10,692,058 B2 * | 6/2020 | Zoldi | ..................... | G06Q 20/10 |
| 11,227,188 B2 * | 1/2022 | Nguyen | ............. | G06F 18/2148 |
| 2010/0049538 A1 * | 2/2010 | Frazer | ................ | G06Q 30/0244 705/14.43 |
| 2015/0019460 A1 * | 1/2015 | Simard | .................. | G06F 3/0482 706/11 |
| 2017/0091319 A1 * | 3/2017 | Legrand | .............. | G06F 16/3346 |
| 2018/0197200 A1 * | 7/2018 | Zoldi | ................. | G06Q 30/0255 |

(Continued)

OTHER PUBLICATIONS

Qazi, Abroon, "Adoption of a probabilistic network model investigating country risk drivers that influence logistics performance indicators", Environmental Impact Assessment Review, vol. 94, May 2022, Elsevier, Science Direct, 20 pages.*

(Continued)

*Primary Examiner* — Robert Stevens
(74) *Attorney, Agent, or Firm* — Mintz, Levin, Cohn, Ferris, Glovsky and Popeo, P.C.; F. Jason Far-hadian, Esq.

(57) ABSTRACT

A method, a system, and a computer program product for generating an interpretable set of features. One or more search parameters and one or more constraints on one or more search parameters for searching data received from one or more data sources are defined. The data received from one or more data sources is searched using the defined search parameters and constraints. One or more first features are extracted from the searched data. The first features are associated with one or more predictive score values. The searching is repeated in response to receiving a feedback data responsive to the extracted first features. One or more second features resulting from the repeated searching are generated.

18 Claims, 12 Drawing Sheets

(56) References Cited

U.S. PATENT DOCUMENTS

| | | | |
|---|---|---|---|
| 2019/0042887 A1* | 2/2019 | Nguyen | G06F 18/2148 |
| 2019/0311301 A1* | 10/2019 | Pyati | G06F 16/901 |
| 2021/0319027 A1* | 10/2021 | Goel | G06F 16/215 |
| 2022/0309332 A1* | 9/2022 | V V Ganeshan | G06N 3/08 |

OTHER PUBLICATIONS

Leong, Chee Kian, "Credit Risk Scoring with Bayesian Network Models", Computational Economics, vol. 47, Mar. 2016, pp. 423-446.*

Bhadra, Anindya, et al., "Merging Two Cultures: Deep and Statistical Learning", arXiv, Cornell University, document: arXiv: 2110.11561v1, Oct. 22, 2021, pp. 1-26.*

Eckerson, Wayne W., "Predictive Analytics: Extending the Value of Your Data Warehousing Investment", 1105 Media, Inc. © 2006, 36 pages.*

* cited by examiner

| ID | TxnDate | TxnAmtUSD | CardType | MerchantCategory | PerDate | days |
|---|---|---|---|---|---|---|
| 2541 | 12/24/2017 | 2.49 | CREDIT_CARD | Supermarkets | 1/1/2018 | -8 |
| 2541 | 12/25/2017 | 24.79 | CREDIT_CARD | Restaurants | 1/1/2018 | -7 |
| 2541 | 12/25/2017 | 10.33 | CREDIT_CARD | Clothing | 1/1/2018 | -7 |
| 2541 | 12/25/2017 | 23.12 | CREDIT_CARD | Supermarkets | 1/1/2018 | -7 |
| 2541 | 12/26/2017 | 8.91 | CREDIT_CARD | Supermarkets | 1/1/2018 | -6 |
| 3866 | 12/2/2017 | 7.2 | CREDIT_CARD | Electronics | 1/1/2018 | -30 |
| 3866 | 12/8/2017 | 7.17 | CREDIT_CARD | Electronics | 1/1/2018 | -24 |
| 3866 | 12/9/2017 | 76.7 | CREDIT_CARD | Retailers | 1/1/2018 | -23 |
| 3866 | 12/11/2017 | 7.7 | CREDIT_CARD | Services | 1/1/2018 | -21 |
| 3866 | 12/13/2017 | 10.29 | CREDIT_CARD | Services | 1/1/2018 | -19 |
| 3866 | 12/13/2017 | 54.37 | CREDIT_CARD | Clothing | 1/1/2018 | -19 |
| 3866 | 12/14/2017 | 9.26 | CREDIT_CARD | Services | 1/1/2018 | -18 |
| 3866 | 12/15/2017 | 25.55 | CREDIT_CARD | Restaurants | 1/1/2018 | -17 |
| 3866 | 12/15/2017 | 28.76 | CREDIT_CARD | Supermarkets | 1/1/2018 | -17 |
| 3866 | 12/15/2017 | 44.7 | CREDIT_CARD | Gas Stations | 1/1/2018 | -17 |
| 3866 | 12/16/2017 | 6.5 | CREDIT_CARD | Restaurants | 1/1/2018 | -16 |
| 3866 | 12/18/2017 | 2.66 | CREDIT_CARD | Services | 1/1/2018 | -14 |
| 3866 | 12/18/2017 | 7.83 | CREDIT_CARD | Restaurants | 1/1/2018 | -14 |
| 3866 | 12/21/2017 | 25.51 | CREDIT_CARD | Supermarkets | 1/1/2018 | -11 |
| 3866 | 12/25/2017 | 13.63 | CREDIT_CARD | Supermarkets | 1/1/2018 | -7 |

| Structured Feature Type | Primary aggregation | Secondary aggregation | Summary column | Filter Columns | Filter Operators | Filter Values | Aggregation columns | Time Anchors | Time Windows | Example |
|---|---|---|---|---|---|---|---|---|---|---|
| Time comparison | Same | Same | Same | Same | Same | Same | Same | Same | Different | Avg. Bal. last 3 months / Avg. Bal. last 6 months |
| Mixed aggregation operation | Different | Different | Same | Same | Same | Same | Same | Same | Same | Max. retail txn last 3 mos / Avg. retail txn last 3 mos |
| Mixed summary | Same | Same | Different | Same | Same | Same | Same | Same | Same | Avg. interest last 3 mos / Avg. Bal. last 3 mos |
| Mixed aggregation level | Same | Same | Same | Same | Same | Same | Different | Same | Same | Avg. customer debit txn last 3 mos / Avg. state debit txn last 3 mos |
| Mixed filter columns | Same | Same | Same | Different | Different | Different | Same | Same | Same | # of "Supermarket" txns last 3 mos / Avg. credit txn amt last 3 mos |
| Mixed filter operators | Same | Same | Same | Same | Different | Same | Same | Same | Same | Avg. credit txn > $50 last 3 mos / Avg. credit txn < $50 last 3 mos |
| Mixed filter values | Same | Same | Same | Same | Same | Different | Same | Same | Same | # of debit txns < $10 last 3 mos / # debit txns < $200 last 3 mos |
| Mixed filter operators & values | Same | Same | Same | Same | Different | Different | Same | Same | Same | # of "Supermarket" txns > $200 last 3 mos / # of "Pharmacy" txns < $10 last 3 mos |

| Cross-Column Parameter Constraints (9 binary choices) | | | | | | | | |
|---|---|---|---|---|---|---|---|---|
| Primary aggregation | Secondary aggregation | Summary column | Filter Columns | Filter Operators | Filter Values | Aggregation columns | Time anchors | Time windows |
| Yes/No | Yes/No | Yes/No | Yes/No | Yes/No | Yes/No | Yes/No | Yes/No | Yes/No |

802 — Cross-column constraints

| Valid Cross-Column Operators (choose 1 of 5) | | | | |
|---|---|---|---|---|
| Ratio | Difference | Sum | Correlation | Slope |
| 1/0 | 1/0 | 1/0 | 1/0 | 1/0 |

804 — Cross-column operator choice

| Within-Column Aggregations (choose 1 of 5) | | | | |
|---|---|---|---|---|
| Avg | Min | Max | Count | SD |
| 1/0 | 1/0 | 1/0 | 1/0 | 1/0 |

806 — Primary aggregation choice; Secondary aggregation choice # of Possible Variable Structures: $(2^9) \times 5 \times 5 \times 5 = 64{,}000$

```
*************************
Template to Report:
*************************
Rank: 1
Operator: slope Column 1 Parameters:
output_level : ID
summary_column_choice : TxnAmtUSD
filter_column_list : ['MerchantCategory', 'days']
filter_value_list : [{'Clothing', 'Gas Stations', 'Car Rental'}, [-6, -3]]
filter_operator_list : [['isin', 'between']]
aggregation_column_list : ['MerchantCategory', 'cardType']
aggregation_type_choice : max
secondary_aggregation_choice : max
time_filter : days
time_window : [-6, -3]
variable_grammar_description : Mixed aggregation level Column 2 Parameters:
output_level : ID
summary_column_choice : TxnAmtUSD
filter_column_list : ['MerchantCategory', 'days']
filter_value_list : [{'Clothing', 'Gas Stations', 'Car Rental'}, [-26, -11]]
filter_operator_list : [['isin', 'between']]
aggregation_column_list : ['MerchantCategory', 'cardType']
aggregation_type_choice : max
secondary_aggregation_choice : max
time_filter : days
time_window : [-26, -11]
variable_grammar_description : Mixed aggregation level WOE pattern is 'concave'..
Binned Information Value: 0.26530720860909309
         x_bin1                wt_bad  wt_good  wt_total      WOE        IV
0  (-99000000.0, -69.729]      7061.0    143.0    7205.0 -3.817638  0.171216
1       (-69.229, -64.000]     2728.0    128.0    2856.0 -0.161380  0.002708
2       (-64.000, -32.872]     3175.0    169.0    3344.0  0.161019  0.018401
3       (-32.872, 0.0]         1045.0     90.0    1135.0  0.594538  0.022615
4       (0.0, inf]             5795.0    852.0    6647.0  0.346635  0.090166
5                Total        19785.0   1015.0  19785.0      NaN  0.265307
```

INTERPRETABLE FEATURE DISCOVERY WITH GRAMMAR-BASED BAYESIAN OPTIMIZATION

BACKGROUND

In many financial and industrial applications, there is a need to leverage data stored in various forms (e.g., transactions, time-stamped records, point-in-time attributes, etc.) to create new variables for use in a model that predicts an outcome of interest. The transformation process that generates these new predictors typically: 1) accounts for differences in the granularity of source data and a target prediction level, 2) produces a human-interpretable representation of an underlying predictive information, 3) generates a set of new predictors that span a full range of available predictive information, and 4) is capable of taking into account any existing information to avoid redundant outputs. Even with a relatively large team of analysts, due to the expense of time and resources, when done manually only a small fraction of such data can be transformed in a way that achieve these goals, oftentimes failing to obtain a meaningful result.

SUMMARY

In some implementations, the current subject matter relates to a computer implemented method for generating an interpretable set of features. The method may include defining, using at least one processor, one or more search parameters and one or more constraints on one or more search parameters for searching data received from one or more data sources, searching, using the defined search parameters and constraints, the data received from one or more data sources, extracting one or more first features from the searched data, where the first features may be associated with one or more predictive score values, repeating the searching in response to receiving a feedback data responsive to the extracted first features, and generating one or more second features resulting from the repeated searching.

In some implementations, the current subject matter can include one or more of the following optional features. The searching may be executed using a Bayesian search. The data may include at least one of the following: a transaction data, a time-series data, a tradeline data, a snapshot data, and any combination thereof.

In some implementations, one or more search parameters may include at least one of the following: one or more data filter parameters, one or more data aggregation parameters, and any combination thereof. One or more constraints may include one or more constraining values associated with each respective search parameter.

In some implementations, each of the first and second features may be determined using one or more feature operators (e.g., Operator Type (ratio)) as a function of one or more search parameters and one or more constraints.

In some implementations, the method may also include evaluating one or more of the first and second features using one or more objective functions, and performing the repeating based on the evaluating. One or more objective functions may include at least one of the following: a function determining a stand-alone value of a binned first or second feature, a function determining an incremental value of a binned first or second feature, and any combination thereof.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 5 illustrates an exemplary input data arranged in a columnar fashion, according to some implementations of the current subject matter;

FIG. 6 illustrates exemplary outputs of the process shown in FIG. 4, according to some implementations of the current subject matter;

FIG. 7 illustrates an exemplary mapping rules structure that may be used to map two-column parameter cross constraints to various resulting structured feature types, according to some implementations of the current subject matter;

FIG. 8 illustrates an exemplary mapping rules structure, according to some implementations of the current subject matter;

FIG. 10 illustrates an exemplary report that may be generated using one or more of the above objective functions, according to some implementations of the current subject matter;

DETAILED DESCRIPTION

In some implementations, the current subject matter may be configured to provide an efficient solution that may identify and/or evaluate aggregated (e.g., best aggregated) variables and/or interactions in a transactional and/or point-in-time source dataset(s) using an integrated Bayesian search process to generate new variables that may be explicitly interpretable and/or highly predictive. Interpretability may be controlled for using a grammar-based approach that may define a set of allowable structures for the discovered predictive variables. Best aggregated variables may be defined by a choice of flexible objective functions that may be used to evaluate usefulness of all variables considered during the search process.

In some implementations, the current subject matter may further be configured to provide an existing score as an input parameter and use an objective function that explicitly searches for predictors representing new (e.g., marginal) information not captured by that score. This aids the search process avoid redundant sources of information, and ensures that the new predictors may be used to improve performance of an existing model and/or score.

The current subject matter may be configured to use various grammar aspects of data during the search process, which may be defined as a pre-defined set of parameter combination constraints that may be used by the search process. The search processes uses the grammar to ensure that the final variables adhere to a set of allowable structures that make them easy to interpret. The grammar also makes the search process more efficient by reducing a dimensionality of a combinatorial space.

Figure 1:
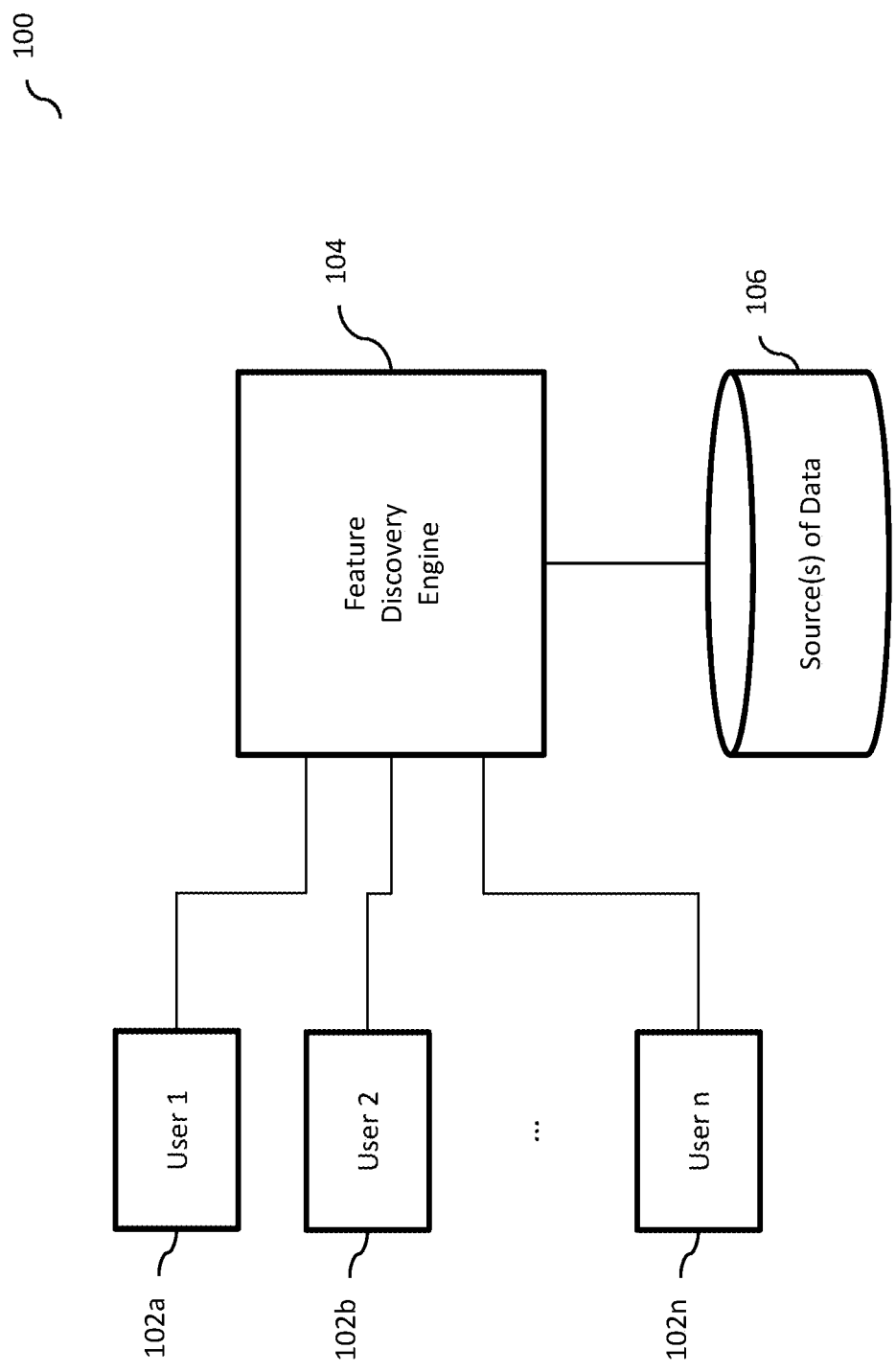
FIG. 1 illustrates an exemplary system for executing an interpretable feature discovery search process, according to some implementations of the current subject matter.

FIG. 1 illustrates an exemplary system 100 for executing an interpretable feature discovery search process, according to some implementations of the current subject matter. The system 100 may include one or more users 102 (a, b . . . n), a feature discovery engine 104, and one or more source(s) of data 106. The system 100 may be configured to be implemented in one or more servers, one or more databases, a cloud storage location, a memory, a file system, a file sharing platform, a streaming system platform and/or device, and/or in any other platform, device, system, etc., and/or any combination thereof. One or more components of the system 100 may be communicatively coupled using one or more communications networks. The communications networks can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

The components of the system 100 may include any combination of hardware and/or software. In some implementations, such components may be disposed on one or more computing devices, such as, server(s), database(s), personal computer(s), laptop(s), cellular telephone(s), smartphone(s), tablet computer(s), and/or any other computing devices and/or any combination thereof. In some implementations, these components may be disposed on a single computing device and/or can be part of a single communications network. Alternatively, or in addition to, the components may be separately located from one another.

The engine 104 may be configured to execute one or more functions associated with determination and/or identification of interpretable features of data received from one or more data sources. The determination/identification of such features may be performed in response to a query that may be received from one or more users 102. The users 102 may include any users, user devices, entities, software applications, functionalities, computers, and/or any other type of users, device, etc. As stated above, in exemplary implementations, some user(s) 102 may be configured to issue queries, receive various results, provide feedback, and/or perform other functionalities associated with the process of determination of interpretable features.

The source(s) of data 106 may be configured to store various data, such as for example, transactional data, time-series data, tradeline data, snapshot data, and/or any other data, and/or any combinations thereof. The data may be used for the purposes of performing analysis and interpretable feature discovery.

In an example implementation, the engine 104 may be configured to define one or more search parameters and one or more constraints on such search parameters for searching various data (e.g., transactional data, time-series data, tradeline data, snapshot data, etc.) that may be queried and/or requested from source(s) of data and/or data source(s) 106. The engine 104 may then execute a transformation of the retrieved data using the defined and/or selected search parameters and related constraints that may be used to control interpretability of output features generated by that transformation. One or more output features, that may be associated with one or more predictive score values, may be extracted from the retrieved data. The transformed features may be evaluated, e.g., by one or more users 102, and feedback in the form of an evaluation of a predictive content of the extracted features may be provided to direct the search process towards a selection of adjusted search parameters, thereby leading to additional transformations containing further predictive information. As a result, the engine 104 may be configured to re-execute the searching process, and generate one or more second features, which may be interpretable in view of the data. For example, the second features may include further information that has not been captured by the predictive score values associated with the initial set of extracted features. Such information may include one or more further predictors that may be extracted from the received data as a result of execution of at least one objective function that may be defined (e.g., by one or more users 102 and/or engine 104) on the retrieved data.

Figure 2:
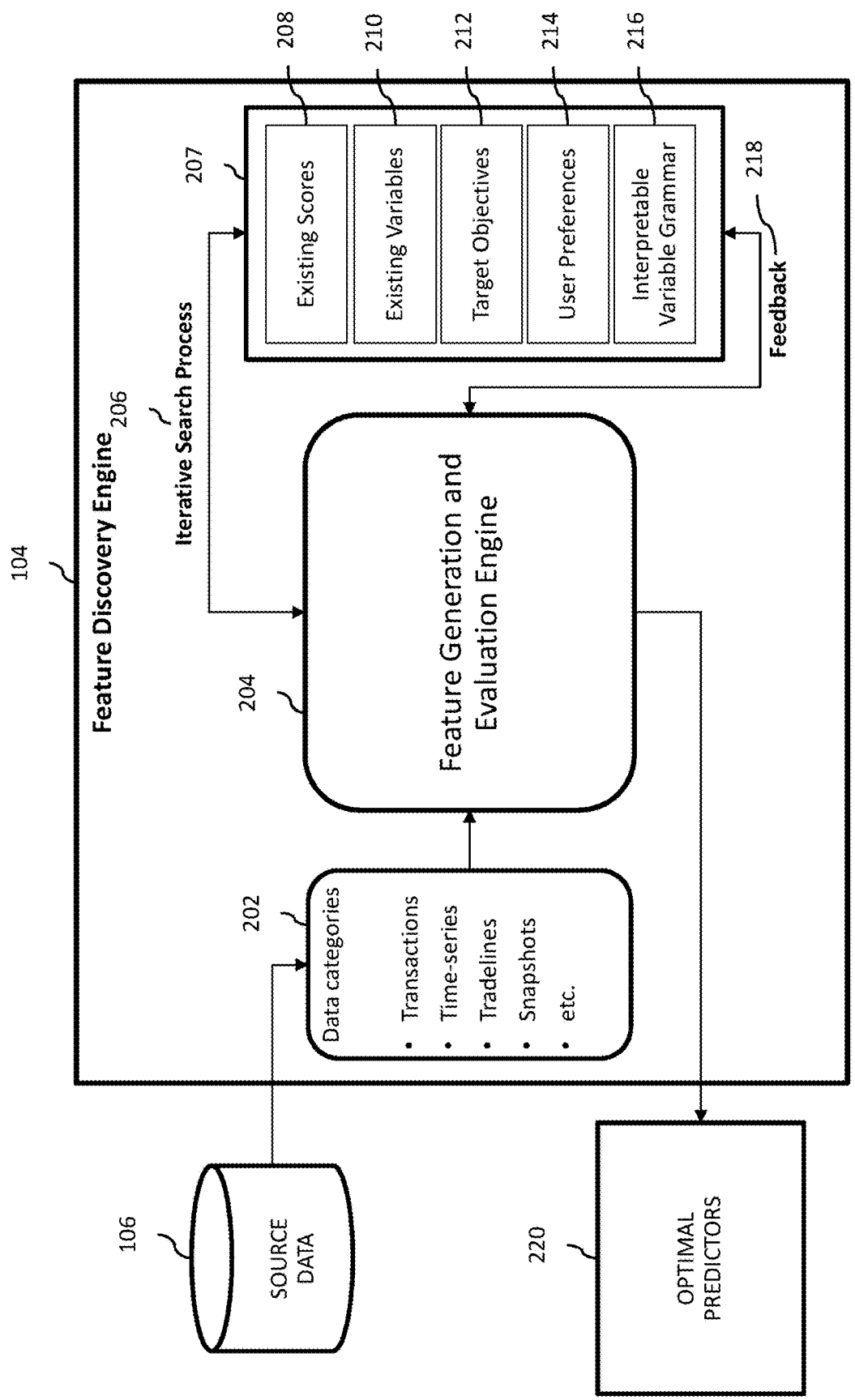
FIG. 2 illustrates further details of the feature discovery engine, according to some implementations of the current subject matter.

FIG. 2 illustrates further details of the feature discovery engine 104, according to some implementations of the current subject matter. The feature discovery engine 104 may be configured to include a data categories component 202, a feature generation and evaluation engine 204, and an input parameters component 207. The input parameters component 207 may be configured to include at least one of the following: an existing scores component 208, an existing variables component 210, a target objectives component 212, a user preferences component 214, an interpretable variable grammar component 216.

The existing scores 208 may be representative of predictive information determined from one or more generated predictive features that may have been previously identified from particular data source(s) 106. The existing variables 210 may be indicative of one or more variables that may be associated with the data stored in the data source(s) 106 (as will be discussed below). Target objectives 212 may correspond to specific targets that the user 102 would like to leverage as independent variables when executing an analysis of data stored in the data source(s) in the form of predictive models. User preferences 214 may correspond to preferences of the user 102 (e.g., date limitations, geographical score limitations, types of transactions, etc.). Interpretable variable grammar 216 may define various allowable data structures and/or constraints that may limit the searching process.

During the feature discovery process, data from one or more data sources 106 may be supplied to the feature discovery engine 104 and may be categorized into one or more categories 202, such as, for example, but not limited to, transactions data, time-series data, tradeline data, snapshot data, and/or any other data. The categorized data may then be provided to the feature generation and evaluation engine 204. The engine 204 may also receive one or more of the existing scores 208, existing variables 210, target objectives 212, user preferences 214, interpretable variable grammar 216, and/or any other data. The engine 204 may process the received information, execute a search (e.g., Bayesian search process) and generate a set of optimal predictor variables. In some implementations, in response to the generated set of optimal predictor variable, a feedback data 218 may be transmitted to the engine 204 in the form of parameter adjustments, which the engine 204 may use to re-execute the searching process. The engine 204 may use the data that has been already received by it and/or request further input parameters 207 as part of the iterative search process 206. The iterative search process 206 may be executed by the engine 204 as many time as desired and/or until desired interpretable features are determined. The feedback data 218 may be provided by the users 102 and/or automatically as part of the process executed by the engine 204.

Figure 3:
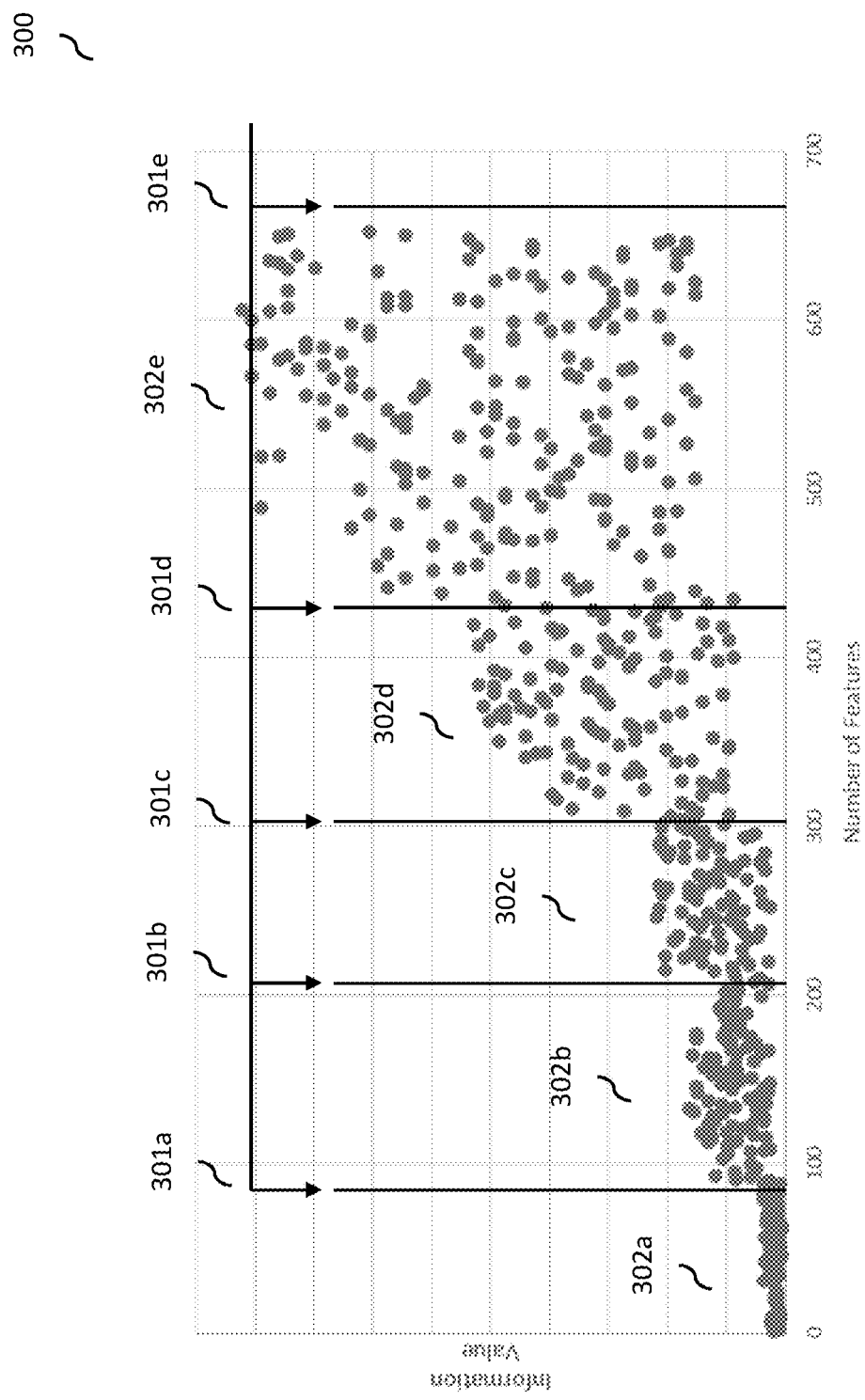
FIG. 3 illustrates an exemplary feedback data plot, according to some implementations of the current subject matter.

FIG. 3 illustrates an exemplary feedback data plot 300, according to some implementations of the current subject matter. As shown by the plot 300, during an initial execution of the above search process and prior to submission of any feedback data, at 301a, the number of features had a low information value 302a. At 301a, feedback data was submitted to the engine 204. As part of the submission, generated predictors may be evaluated and "best" ones (e.g., representative of a target values of the search and analysis process requested by one or more users 102) may be selected for integration into a base model to generate a new marginal score target that may be fed back into the search process as a new parameter that drives a discovery of additional new transformations containing further incremental predictive information. Additionally, an updated information any models (e.g., "base models") that may have been used for searching and evaluation of data in the data sources may be submitted as part of the feedback data, at 301a. Once the engine 204 receives this feedback data, the search process is re-executed, thereby generating a feature space 302b that may have a higher information value with a greater number of features (e.g., up to 200). Further feedback data (e.g., evaluation/selection of best predictors, updating of base models, etc.) may be submitted, at 301b, and the engine 204 may re-execute the search again to generate a feature space 302c with an even higher information value/greater number of features (e.g., up to 300). The process may continue as long as desired and/or until a final feedback data is submitted, at 301e, indicating that no further searching is required and, a requisite number of interpretable features has been achieved.

Figure 4:
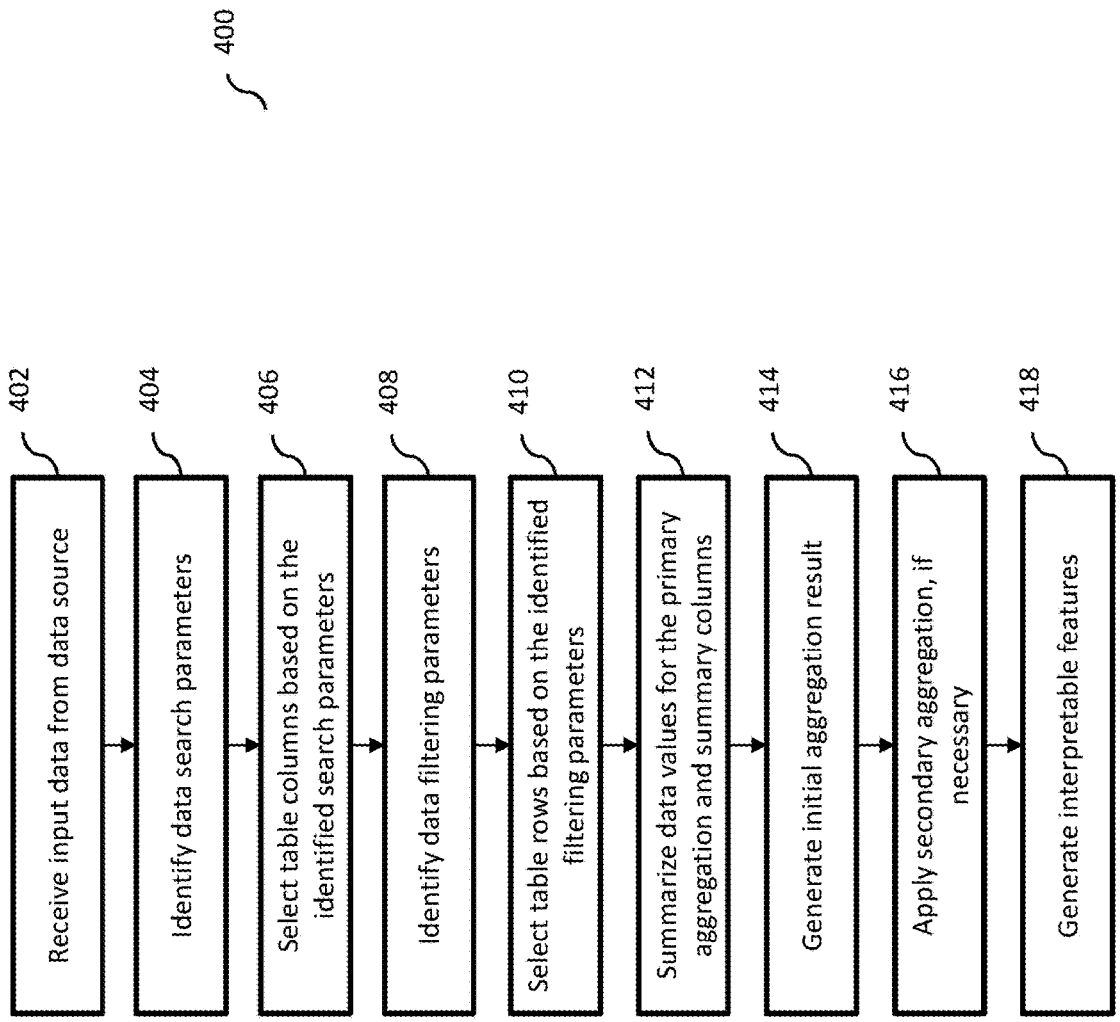
FIG. 4 illustrates an exemplary process that may be executed by the feature discovery engine shown in FIGS. 1 and 2, according to some implementations of the current subject matter.

FIG. 4 illustrates an exemplary process 400 that may be executed by the feature discovery engine 104 shown in FIGS. 1 and 2, according to some implementations of the current subject matter. In particular, the process 400 may be configured to execute a 'generate_column' function for the purposes of obtaining a set of interpretable features from an input data received from one or more data sources 106 (as shown in FIGS. 1-2). At 402, data (e.g., stored in one or more tables, and/or in any other fashion) may be received from one or more data sources 106. One or more search parameters may be identified and/or selected by the engine 104, at 404. For example, search parameters may be used to search various transaction data to determine purchasing habits of customers using credit cards in a particular period of time.

At 406, the engine 104 may be configured to select one or more table columns (e.g., required columns) from the received data based on the selected search parameters. FIG. 5 illustrates an exemplary input data 500 arranged in a columnar fashion. For example, the engine 104 may select a transaction ID, a transaction date ("TxnDate"), transaction amount in US dollars ("TxnAmtUSD"), card type that was used for the transaction ("cardType"), merchant category ("MerchantCategory"), e.g., supermarkets, restaurants, etc., as well as other columns.

The engine 104 may also perform filtering of the input data through selection of filtration parameters (e.g., cardType="credit card", etc.), at 408, and selecting table rows based on the identified filtering parameters, at 410. As shown in FIG. 5, if the filtering parameter cardType="credit card" is only used, then all rows shown in FIG. 5 would be selected.

Figure 6:
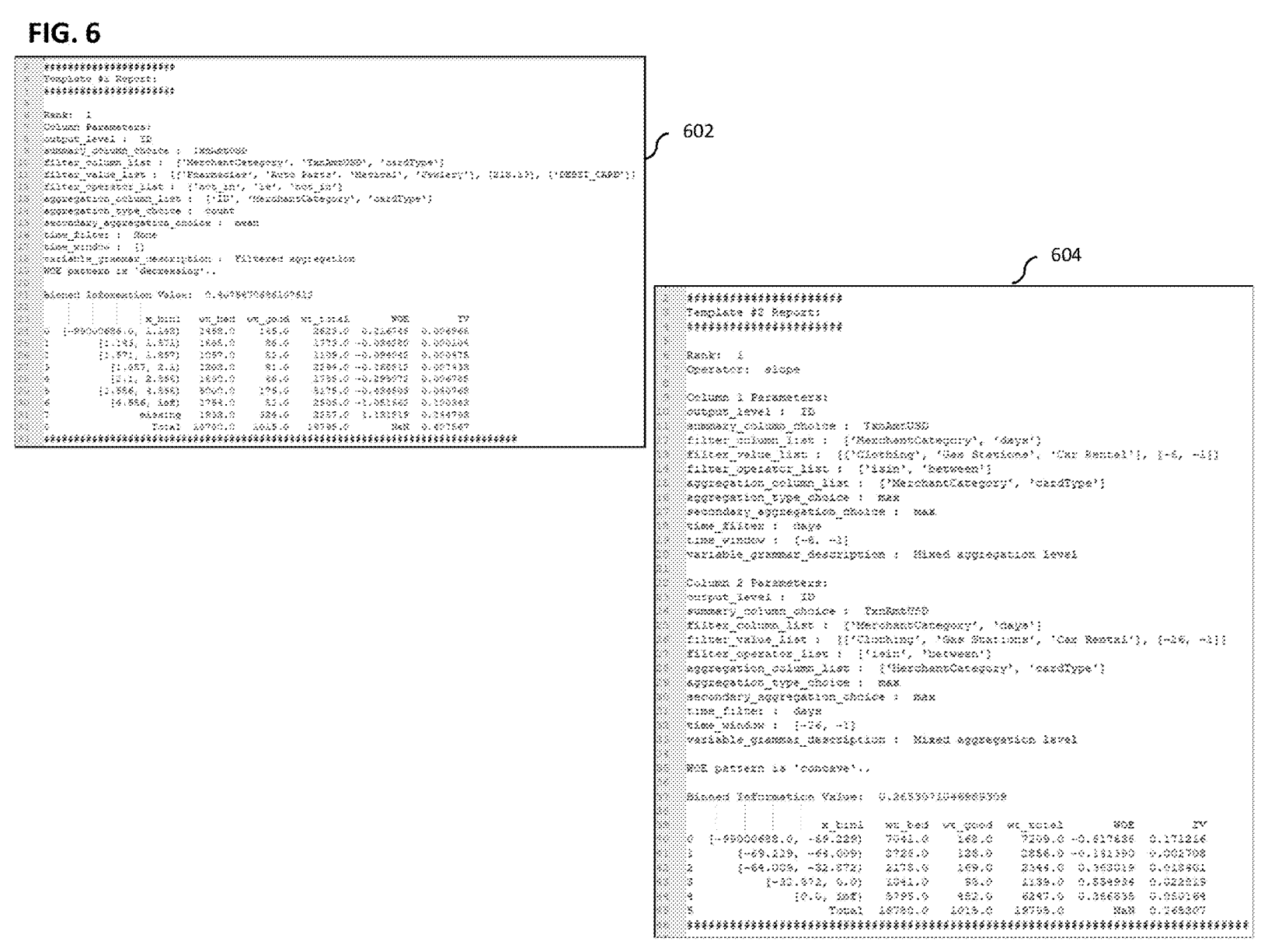

At 412, the engine 104 may be configured to perform aggregation of the filtered data by summarizing data values for the primary aggregation and summary columns. An initial aggregation result may then be generated, at 414, where any rows excluded by the filtration (at 410) may be merged back onto the aggregated results, with NULLs inserted in a new column. If the initial aggregation result is not equal to a desired output-level, the engine 104 may be configured to apply secondary aggregation to the initial aggregation result, at 416. In some implementations, various aggregation levels may be selected to determine values at a higher and/or lower level of aggregation while still producing output level data. This may be helpful for determination of ratios of user-level behavior relative to aggregated behaviors, such as, for the purposes of generating an 'Indexed Ratio' (as discussed in the example below). At 418, the engine 104 may be configured to generate an output (e.g., a set of interpretable features). FIG. 6 illustrates exemplary outputs 602 and 604 of the process 400.

As stated above, an indexed ratio associated with the transaction input data 500 shown in FIG. 5 may be determined as follows:

$$\text{indexed ratio} = \frac{\text{average supermarket credit card txn amount last 12 months for this customer}}{\text{average supermarket credit card txn amount last 12 months for this region}}$$

To determine the above indexed ratio, one or more of the following filter parameters may be selected: card type (credit card), merchant type (supermarket), time window (12 months); one or more of the following aggregation parameters may be selected: operation (average), value (txn amount), level: (customer, region); and one or more feature operators may be used: operator type (ratio). As can be understood, for any other type of interpretable feature, any other desired parameters (e.g., filter, aggregation, etc.) and/ or any other feature operators may be selected and/or used. Interpretability may be achieved by setting one or more specific constraints on one or more structured feature parameters, which may be referred to as a "feature grammar". For example, in the above "indexed ratio" scenario, all parameters for the numerator and the denominator may be constrained to be equal except for the aggregation parameter "level" (i.e., customer vs. region). In some implementations, the current subject matter may be configured to include a library of interpretable feature parameter constraints from which one or more such constraints may be selected (e.g., either by the engine 104 and/or one or more users 102). Once such constraints are selected, the engine 104 may be configured to execute a search of data in accordance with such constraints and generate an appropriate feature. Alternatively, or in addition, any searches that may be executed by the engine 104 may be unconstrained, which may cause a broader search to be executed, thereby improving predictiveness of the result at the expense of interpretability.

FIG. 7 illustrates an exemplary mapping rules structure 700 that may be used to map two-column parameter cross constraints to various resulting structured feature types, according to some implementations of the current subject matter. As shown in FIG. 7, the cross-column parameter constraints may be same or different across a primary aggregation column, a secondary aggregation column, a summary column, filter column(s), filter operator(s) column, filter value(s) column, aggregation columns, time anchor(s) column, and time window(s) column. The feature types may include at least one of the following: a time comparison, a mixed aggregation operation, a mixed summary, a mixed aggregation level, mixed filter column(s), mixed filter operator(s), mixed filter value(s), mixed filter operator(s) and value(s), and/or any other feature types. For example, a ratio of an average balance that lasts 3 months to average balance that lasts 6 months may correspond to a time comparison feature type and may have same cross-column parameter constraints except the time window constraint (i.e., 3 months vs. 6 months).

In some implementations, the above-described column-generator function (e.g., as shown in FIG. 4) may be configured to use constrained parameters as inputs to generate two sub-columns that may be combined to generate a final variable. The engine 104 may execute a Bayesian optimization search to map these structures to time-series and/or snapshot data in many-dimensional parameter space. As part of the optimization search, the engine 104 may be configured to use various operators and/or filtering options. Some non-limiting examples of the operators may include multi-attribute feature operators, such as, ratio, sum, difference, correlation, slope, etc. The engine 104 may also use one or more aggregation operators, such as, for example, average, min, max, count, variance, etc. The engine 104 may also apply numerical and/or categorical value sets filtering with optional anchored time windows as well as one or more of the following filter operators: gt (greater than), ge (greater than or equal to), lt (less than), le (less than or equal to), eq (equal), between, in, not between, not in, and/or any other operators. The structured feature types may also be extended to include additional cross-column parameter constraints.

FIG. 8 illustrates an exemplary mapping rules structure 800, according to some implementations of the current subject matter. As shown in FIG. 8, the rules structure 800 may be configured to generate 64,000 possible structures based on a shown set of parameters for use in the column generation function. In particular, the mapping rules structure 800 may include cross-column constraints 802, cross-column operator choice 804, and primary and secondary aggregation choices 806. Similar to the structure 700, the cross-column constraints 802 may include a primary aggregation column, a secondary aggregation column, a summary column, filter column(s), filter operator(s) column, filter value(s) column, aggregation columns, time anchor(s) column, and time window(s) column, each of which may be selectable and may be assigned a value of Yes or No. The cross-column operator choice 804 may include valid cross-column operators, e.g., ratio, difference, sum, correlation, slope, each of which may be selectable and may be assigned a value of 1 or 0. Likewise, the primary and secondary aggregation choices 806 may correspond to within-column aggregations, such as, for example, Avg (average), Min (minimum), Max (maximum), Count, and SD (standard deviation). For each primary and secondary aggregation choices, each of these may be selectable and may be assigned a value of 1 or 0, as shown in FIG. 8. As such, a total possible number of structures may be applied to the data received from the data source 106 may be $2^9 \times 5 \times 5 \times 5 = 64{,}000$.

Moreover, for each structure out of 64,000, additional constraints and/or other limitations may be applied as well, such as for example, aggregation variables (e.g., up to 5), output level variable (e.g., 1), time window values (e.g., 2), summary variable choice (e.g., 1), filter variables (e.g., up to 5), filter operators (e.g., gt, ge, lt, le, between, not between, in, not in) that may be based on filter variable type, filter values that may be based on either user-defined lists (e.g., discrete time windows) and/or raw filter variable values (e.g., from data), and/or any other operators, constraints, variables, etc. As can be understood, the above structures/constraints may be configured to ensure that interpretable variables are generated as well as to increase the speed of searches and/or identification of relevant data by reducing the search space size.

Figure 9:
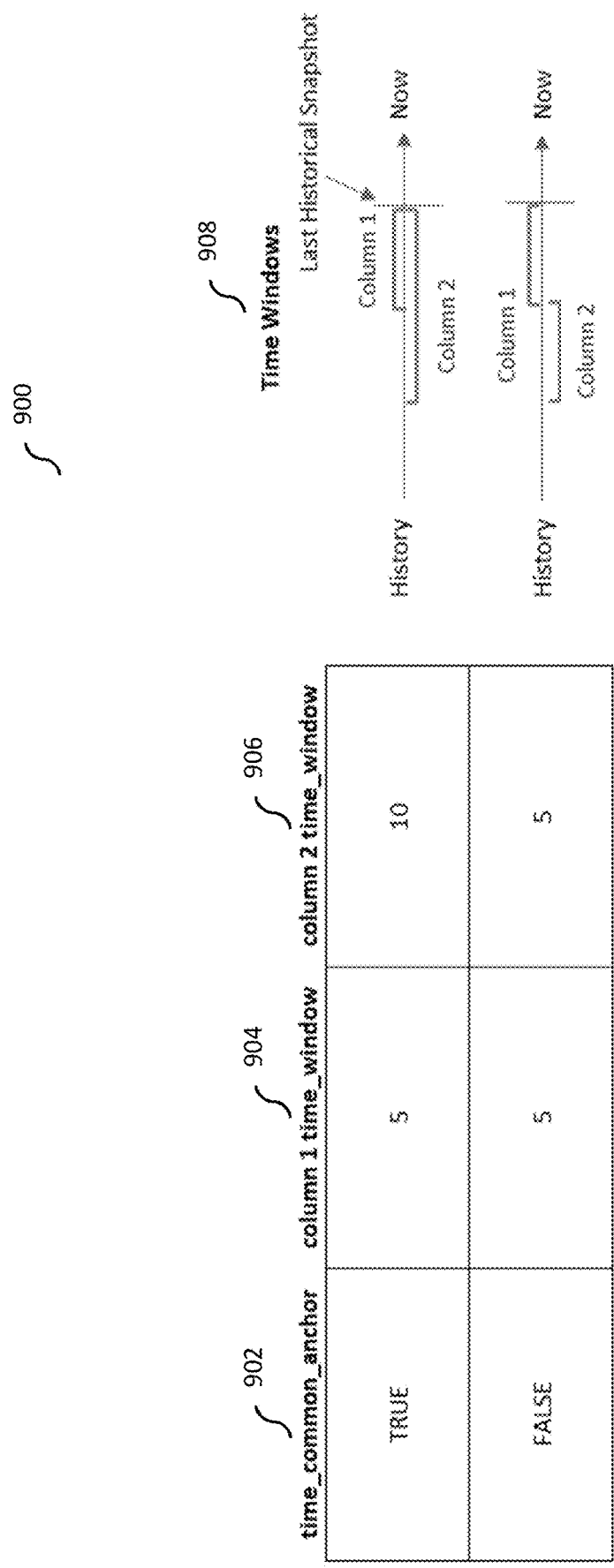
FIG. 9 illustrates another exemplary mapping rules structure that may be used for time-series data, according to some implementations of the current subject matter.

FIG. 9 illustrates another exemplary mapping rules structure 900 that may be used for time-series data, according to some implementations of the current subject matter. To search time-series data, the engine 104 may be configured to set one or more controls for each time-based variable to define one or more possible time windows that may be used as filter parameters in every generated column. As shown in FIG. 9, because of a time-based nature of the time-series data, the engine 104 may be configured to use one or more of the following constraints: a list of columns (e.g., "time_filter_columns") representing one or more time periods (e.g., days, hours, minutes, etc.) as negative integers relative to an anchor, a value representing a common reference time in the time filter column(s) (e.g., "time value anchor"), a constraint indicating whether both windows start at the anchor, and/or if the second window starts after the first window ends (e.g., "time_common_anchor"), a length constraint (e.g., "time_window") selected for column 1 and/or column 2 (e.g., [5, 10, 30, 60, 90]), and/or any other constraints. In some implementations, to avoid truncated windows during a search, at least one 'time_window' value that is less than the difference between the maximum 'time_filter' value in the data and the largest 'time_window' value may be selected.

As shown in FIG. 9, for time windows 908, a time_common_anchor constraint 902 may be selected and assigned values TRUE or FALSE, and sizes of time_window columns 1 904 and 2 906 may be selected. For example, if time_common_anchor constraint 902 has a FALSE value, both column 1 and 2 time_window may have a size value of 5.

In some implementations, the current subject matter's feature search (e.g., Bayesian Tree Parzen Estimators (TPE)) may require that all of its parameters (e.g., constraints) be encoded as integers. As such, the engine 104, to include categorical filter values in the search process, may be configured to encode any combination of categories of filters and/or any other constraints from a particular filter column as a single integer. This may be accomplished using a combinatorial numbering system that may enable selection of up to one or more (e.g., 5) classes to use as filters from a selected filter column. To do so, the engine 104 may be configured to determine a number of unique classes in the categorical filter column (n) (e.g., based on the selected filters). Then, the engine 104 may select a number of classes to be chosen (e.g., k=1-5) and use a function C(n, k) to determine a number of possible combinations for a particular n and k. The engine 104's search process may then select a number (i) between 1 and the value of C(n, k). A function cgen(i, n, k) may be used to determine one or more indexes of classes associated with combination i. The engine 104 may then select one or more class values to filter corresponding to these indexes. The categorical filter search space may be very large, e.g., for a column with 20 unique classes: C(20,5)=15,504 possible combinations of 1 to 5 values. As such, pre-processing of categorical values via weight-of-evidence (WOE)-based binning may be performed by the engine 104.

In some implementations, the engine 104 may use modular objective functions to execute a contextual search of the data received from one or more sources 106. Once a candidate feature has been generated, the engine 104 may select an objective function for evaluation, and use the resulting value in its the parameter search (e.g., using Bayesian TPE search process). For example, the engine 104 may use objective function options, 'binned iv' and 'marginal iv', both of which use a pattern-aware optimized binning process that may evaluate ascending, descending, convex and concave WOE patterns. The binned iv function may measure a stand-alone information value of the binned feature using the best pattern. The marginal iv function may measure an incremental information value of the binned feature on margin to an existing score.

FIG. 10 illustrates an exemplary report 1000 that may be generated using one or more of the above objective functions, according to some implementations of the current subject matter. As shown in FIG. 10, the search of the source data 106 may be constrained using the following: an operator: slope, column 1 parameters and column 2 parameters (shown in FIG. 10). The engine 104 may determine that the WOE pattern is concave. It may also determine a total binned information value along with chart summarizing the target variable pattern indicating how it arrived at that result.

The objective function code may be modular, thus, any function that evaluates a feature may be implemented to make the search process contextual. Some non-limiting examples of such context may involve determination of a fraud value detection rate, marketing net response, collections roll rate, etc.

In some implementations, the engine 104 may be configured to save the results of the features that it has determined. It may save the discovered features (e.g., as columns). Alternatively, or in addition to, the engine 104 may save the parameters associated with such features (e.g., in a pickled Python file written to disk as a serialized object saved in the run folder). These parameters may then be used in a separate post-search process to re-generate the columns and associated reports on-demand. As can be understood, any other way of saving the results are possible.

Figure 11:
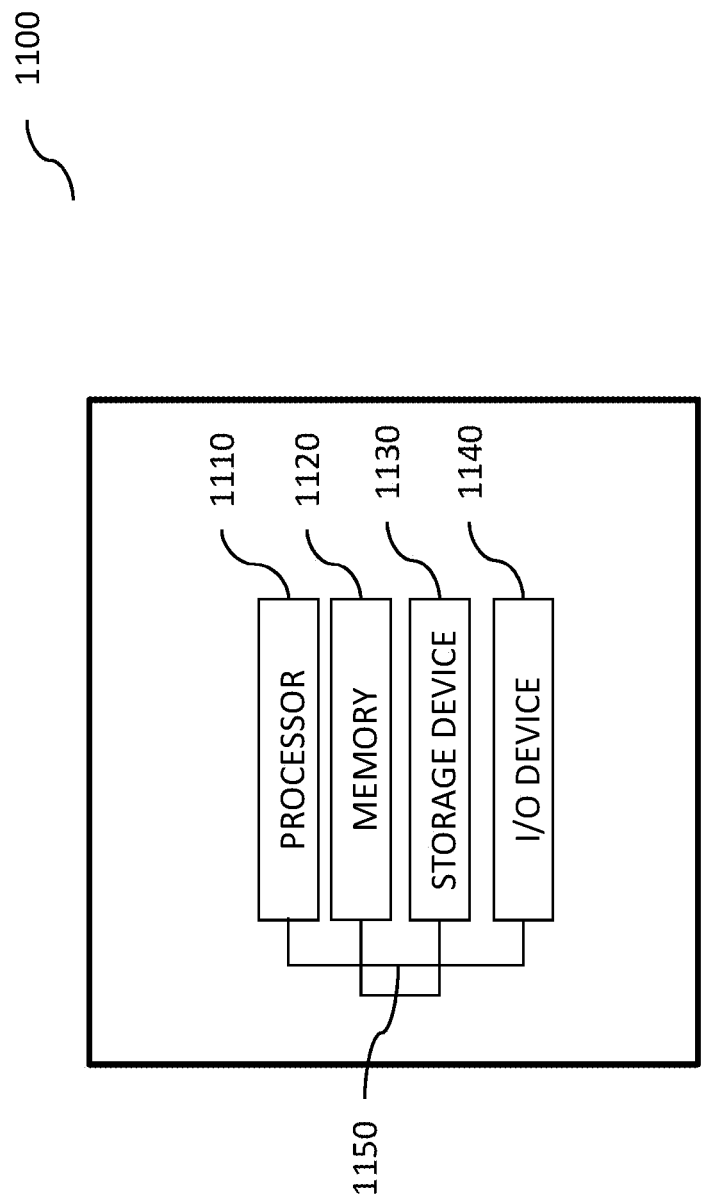
FIG. 11 illustrates an example of a system, according to some implementations of the current subject matter.

In some implementations, the current subject matter may be configured to be implemented in a system 1100, as shown in FIG. 11. The system 1100 may include a processor 1110, a memory 1120, a storage device 1130, and an input/output device 1140. Each of the components 1110, 1120, 1130 and 1140 may be interconnected using a system bus 1150. The processor 1110 may be configured to process instructions for execution within the system 1100. In some implementations, the processor 1110 may be a single-threaded processor. In alternate implementations, the processor 1110 may be a multi-threaded processor. The processor 1110 may be further configured to process instructions stored in the memory 1120 or on the storage device 1130, including receiving or sending information through the input/output device 1140. The memory 1120 may store information within the system 1100. In some implementations, the memory 1120 may be a computer-readable medium. In alternate implementations, the memory 1120 may be a volatile memory unit. In yet some implementations, the memory 1120 may be a non-volatile memory unit. The storage device 1130 may be capable of providing mass storage for the system 1100. In some implementations, the storage device 1130 may be a computer-readable medium. In alternate implementations, the storage device 1130 may be a floppy disk device, a hard disk device, an optical disk device, a tape device, non-volatile solid state memory, or any other type of storage device. The input/output device 1140 may be configured to provide input/output operations for the system 1100. In some implementations, the input/output device 1140 may include a keyboard and/or pointing device. In alternate implementations, the input/output device 1140 may include a display unit for displaying graphical user interfaces.

Figure 12:
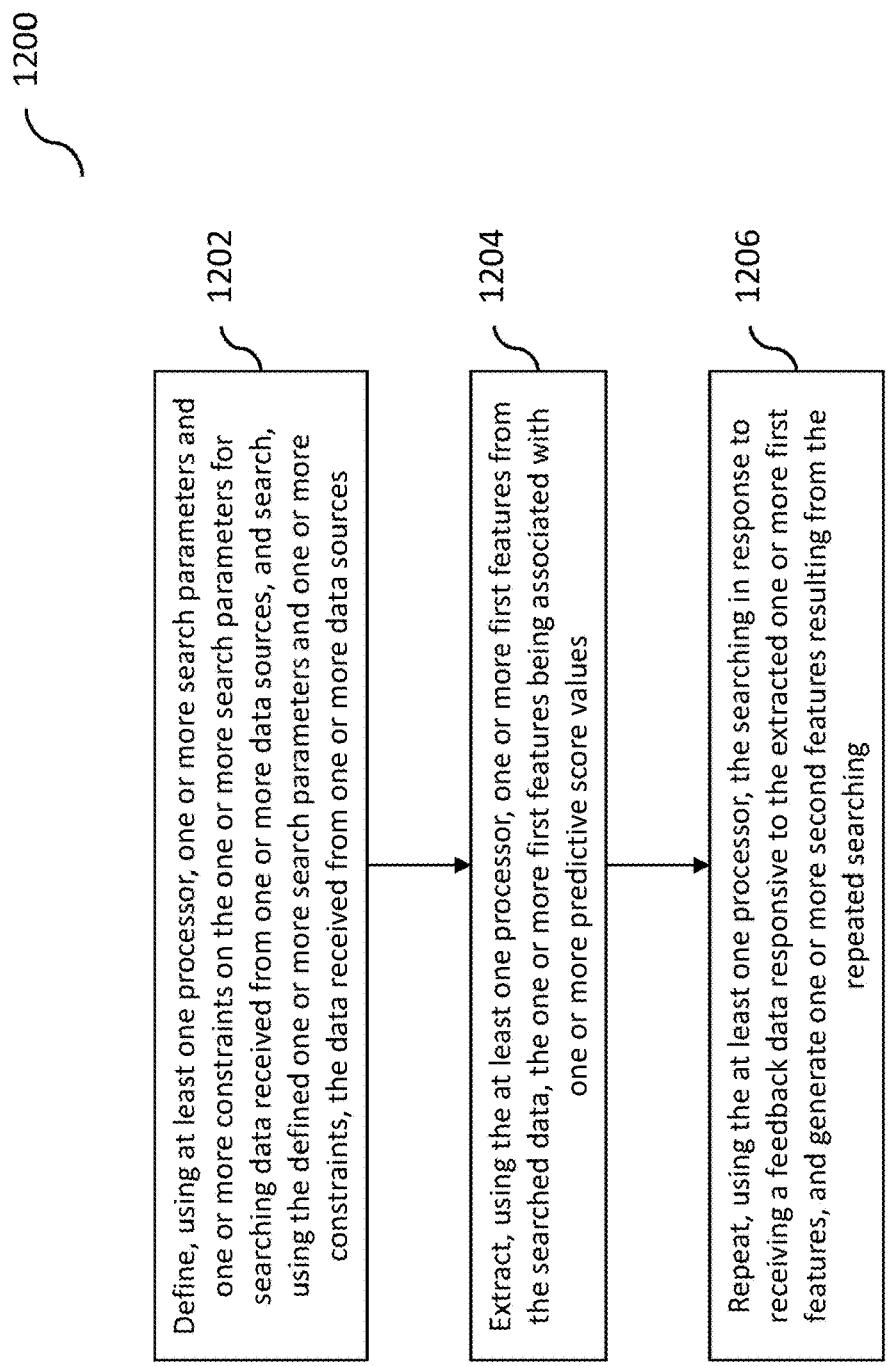
FIG. 12 illustrates an example of a method, according to some implementations of the current subject matter.

FIG. 12 illustrates an example of a method 1200 for generating an interpretable set of features, according to some implementations of the current subject matter. The method 1200 may be performed by the system 100, including various elements shown in FIGS. 2-11. For example, the process 1200 may be executed using the engine 104 (shown in FIGS. 1 and 2), where the engine(s) may be any combination of hardware and/or software.

At 1202, the engine 104 may defining one or more search parameters (e.g., filter parameters, such as "card type", "merchant type", etc., aggregation parameters, such as, "operation", "value", etc.) and one or more constraints (e.g., "credit card", "supermarket", etc.) on one or more search parameters for searching data received from one or more data sources 106. The engine 104 may then execute searching (e.g., suing Bayesian TPE process and/or any other process) using the defined one or more search parameters and one or more constraints, of the data received from one or more data sources.

The engine 104 may then, at 1204, extracting one or more first features from the searched data (e.g., an "indexed ratio" using a feature operator type). The features may be associated with one or more predictive score values.

At 1206, the engine 104 may be configured to repeat the searching in response to receiving a feedback data (e.g., analyst user 102 feedback, automated feedback, etc.) responsive to the extracted first features. The engine 104 may then generate one or more second features resulting from the repeated searching. This may result in a more refined set of features that may be initially sought.

In some implementations, the current subject matter can include one or more of the following optional features. The searching may be executed using a Bayesian search. The data may include at least one of the following: a transaction data, a time-series data, a tradeline data, a snapshot data, and any combination thereof.

In some implementations, one or more search parameters may include at least one of the following: one or more data filter parameters, one or more data aggregation parameters, and any combination thereof. One or more constraints may include one or more constraining values associated with each respective search parameter.

In some implementations, each of the first and second features may be determined using one or more feature operators (e.g., Operator Type (ratio)) as a function of one or more search parameters and one or more constraints.

In some implementations, the method may also include evaluating one or more of the first and second features using one or more objective functions, and performing the repeating based on the evaluating. One or more objective functions may include at least one of the following: a function determining a stand-alone value of a binned first or second feature, a function determining an incremental value of a binned first or second feature, and any combination thereof.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer implemented method, comprising:

defining, using at least one processor, one or more search parameters and one or more constraints on the one or more search parameters for searching data received from one or more data sources, and searching, using the defined one or more search parameters and one or more constraints, the data received from one or more data sources;

extracting, using the at least one processor, one or more first features from the searched data, the one or more first features being associated with one or more predictive score values;

repeating, using the at least one processor, the searching in response to receiving a feedback data responsive to the extracted one or more first features, and generating one or more second features resulting from the repeated searching, and evaluating one or more of the first and second features using one or more objective functions, and performing the repeating based on the evaluating, the one or more objective functions including at least one of the following: a function determining a stand-alone value of a binned first or second feature, a function determining an incremental value of a binned first or second feature, and any combination thereof.

2. The method according to claim 1, wherein the searching is executed using a Bayesian search.

3. The method according to claim 1, wherein the data includes at least one of the following: a transaction data, a time-series data, a tradeline data, a snapshot data, and any combination thereof.

4. The method according to claim 1, wherein the one or more search parameters comprise at least one of the following: one or more data filter parameters, one or more data aggregation parameters, and any combination thereof.

5. The method according to claim 1, wherein the one or more constraints include one or more constraining values associated with at least one respective search parameter in the one or more search parameters.

6. The method according to claim 1, wherein least one of the first and second features are determined using one or more feature operators as a function of the one or more search parameters and the one or more constraints.

7. A system comprising:

at least one programmable processor; and a non-transitory machine-readable medium storing instructions that, when executed by the at least one programmable processor, cause the at least one programmable processor to perform operations comprising:

defining, using at least one processor, one or more search parameters and one or more constraints on the one or more search parameters for searching data received from one or more data sources, and searching, using the defined one or more search parameters and one or more constraints, the data received from one or more data sources;

extracting, using the at least one processor, one or more first features from the searched data, the one or more first features being associated with one or more predictive score values;

repeating, using the at least one processor, the searching in response to receiving a feedback data responsive to the extracted one or more first features, and generating one or more second features resulting from the repeated searching, and evaluating one or more of the first and second features using one or more objective functions, and performing the repeating based on the evaluating, the one or more objective functions including at least one of the following: a function determining a stand-alone value of a binned first or second feature, a function determining an incremental value of a binned first or second feature, and any combination thereof.

8. The system according to claim 7, wherein the searching is executed using a Bayesian search.

9. The system according to claim 7, wherein the data includes at least one of the following: a transaction data, a time-series data, a tradeline data, a snapshot data, and any combination thereof.

10. The system according to claim 9, wherein the one or more constraints include one or more constraining values associated with each at least one respective search parameter in the one or more search parameters.

11. The system according to claim 7, wherein the one or more search parameters comprise at least one of the following: one or more data filter parameters, one or more data aggregation parameters, and any combination thereof.

12. The system according to claim 7, wherein at least one of the first and second features are determined using one or more feature operators as a function of the one or more search parameters and the one or more constraints.

13. A computer program product comprising a non-transitory machine-readable medium storing instructions that, when executed by at least one programmable processor, cause the at least one programmable processor to perform operations comprising:

defining, using at least one processor, one or more search parameters and one or more constraints on the one or more search parameters for searching data received from one or more data sources, and searching, using the defined one or more search parameters and one or more constraints, the data received from one or more data sources;

extracting, using the at least one processor, one or more first features from the searched data, the one or more first features being associated with one or more predictive score values;

repeating, using the at least one processor, the searching in response to receiving a feedback data responsive to the extracted one or more first features, and generating one or more second features resulting from the repeated searching, and evaluating one or more of the first and second features using one or more objective functions, and performing the repeating based on the evaluating, the one or more objective functions including at least one of the following: a function determining a stand-alone value of a binned first or second feature, a function determining an incremental value of a binned first or second feature, and any combination thereof.

14. The computer program product according to claim 13, wherein the searching is executed using a Bayesian search.

15. The computer program product according to claim 13, wherein the data includes at least one of the following: a transaction data, a time-series data, a tradeline data, a snapshot data, and any combination thereof.

16. The computer program product according to claim 13, wherein the one or more search parameters comprise at least one of the following: one or more data filter parameters, one or more data aggregation parameters, and any combination thereof.

17. The computer program product according to claim 13, wherein the one or more constraints include one or more constraining values associated with at least one respective search parameter in the one or more search parameters.

18. The computer program product according to claim 13, wherein least one of the first and second features are determined using one or more feature operators as a function of the one or more search parameters and the one or more constraints.

* * * * *